(12) United States Patent
Sakoske et al.

(10) Patent No.: US 6,997,018 B2
(45) Date of Patent: Feb. 14, 2006

(54) METHOD OF MICRO AND NANO TEXTURING GLASS

(75) Inventors: George E. Sakoske, Washington, PA (US); Martin Baumann, Bad Vilbel (DE)

(73) Assignee: Ferro Corporation, Cleveland, OH (US)

( * ) Notice: Subject to any disclaimer, the term of this patent is extended or adjusted under 35 U.S.C. 154(b) by 224 days.

(21) Appl. No.: 10/452,845

(22) Filed: Jun. 2, 2003

(65) Prior Publication Data

US 2004/0237590 A1 Dec. 2, 2004

(51) Int. Cl.
*C03C 17/23* (2006.01)

(52) U.S. Cl. .................. 65/60.2; 65/60.3; 65/60.53; 65/99.4

(58) Field of Classification Search .................. 65/60.2, 65/60.3, 60.5, 60.53, 99.2, 99.4
See application file for complete search history.

(56) References Cited

U.S. PATENT DOCUMENTS

| | | | |
|---|---|---|---|
| 3,300,289 A | 1/1967 | Long | |
| 3,354,022 A | 11/1967 | Dettre et al. | |
| 3,361,550 A | 1/1968 | Murphy et al. | |
| 3,472,641 A | * 10/1969 | Gray | 65/60.5 |
| 3,681,043 A | 8/1972 | Bognar | |
| 3,850,679 A | 11/1974 | Sopko et al. | |
| 3,852,098 A | 12/1974 | Bloss et al. | |
| 3,888,649 A | 6/1975 | Simham | |
| 3,899,314 A | 8/1975 | Siegmund | |
| 3,951,633 A | 4/1976 | Danihel | |
| 4,130,673 A | 12/1978 | Larkin | |
| 4,206,252 A | 6/1980 | Gordon | |
| 4,293,335 A | 10/1981 | Tamamura et al. | |
| 4,325,988 A | 4/1982 | Wagner | |
| 4,401,695 A | 8/1983 | Sopko | |
| 4,533,571 A | * 8/1985 | Kramer et al. | 427/180 |
| 4,547,400 A | 10/1985 | Middleton et al. | |
| 5,368,892 A | * 11/1994 | Berquier | 427/299 |
| 5,723,172 A | * 3/1998 | Sherman | 427/109 |
| 5,939,201 A | 8/1999 | Boire et al. | |
| 6,467,309 B1 | * 10/2002 | Hishinuma et al. | 65/99.2 |
| 2002/0142150 A1 | 10/2002 | Baumann et al. | |
| 2003/0037569 A1 | * 2/2003 | Arbab et al. | 65/22 |

FOREIGN PATENT DOCUMENTS

| | | |
|---|---|---|
| WO | PCT/EP95/02934 | 2/1996 |
| WO | PCT/US02/08371 | 10/2002 |

* cited by examiner

*Primary Examiner*—Sean Vincent
(74) *Attorney, Agent, or Firm*—Rankin, Hill, Porter & Clark LLP

(57) ABSTRACT

The present invention provides a method of forming a glass article having a transparent hydrophobic surface during a glass-forming operation. In accordance with the method, a plurality of solid particles of inorganic material having an average diameter of less than about 400 nm are applied to a surface of the glass article when the glass article is at a temperature within the range of from about 700° C. to about 1200° C. The inorganic particles fuse to the surface of the glass article to form the transparent hydrophobic surface. Optionally, a fluorosilane agent can be applied to the transparent hydrophobic surface to further increase its hydrophobicity. The transparent hydrophobic surface has a nanostructured texture, which makes the surface of the glass article very hydrophobic and easy to clean. In addition, application of the transparent hydrophobic surface to the glass article does not adversely affect the optical clarity of the glass article and it helps reduce the amount of incident light reflected from the surface of the glass article.

10 Claims, 1 Drawing Sheet

METHOD OF MICRO AND NANO TEXTURING GLASS

BACKGROUND OF THE INVENTION

1. Field of Invention

The present invention relates to methods of forming microstructures or, more preferably, nanostructures on glass surfaces during hot forming operations.

2. Description of Related Art

It is known that glass surfaces that are micro-textured tend to exhibit a higher degree of hydrophobicity than non-textured glasses, particularly when the micro-textured glass surface is treated with a fluorosilane agent. The current practice for creating hydrophobic micro-textured glass surfaces involves applying (e.g., by screen printing, roll coating or spraying) a flowable composition containing glass frits and/or inorganic oxides onto a pre-formed glass surface, drying the composition on the glass surface and then firing the glass at a temperature between about 300° C. and about 700° C. to fuse the glass frits and/or inorganic oxides to the surface of the pre-formed glass. After the glass cools, the treated surface of the glass is sprayed with a silicate and/or silane and a fluorosilane and dried. The treated glass is then re-heated to a temperature between about 200° C. and about 300° C. to bond the fluorosilane agent to the micro-textured glass surface. The micro-textured glass surface thus formed is very hydrophobic, which makes it easy to clean.

While conventional micro-texturing methods are effective at creating durable hydrophobic surfaces on pre-formed glass surfaces, there is room for improvement. For example, it would be advantageous if the hydrophobic surface could be formed during the glass forming operation in order to eliminate the need for reheating the glass. Furthermore, it would be advantageous if the texture formed on the surface of the glass would have a nano-structure rather than a micro-structure.

BRIEF SUMMARY OF THE INVENTION

The present invention provides a method of forming a glass article having a transparent hydrophobic surface during a glass-forming operation. In accordance with the method, a plurality of solid particles of inorganic material having an average diameter of less than about 400 nm are applied to a surface of the glass article when the glass article is at a temperature within the range of from about 700° C. to about 1200° C. The inorganic particles fuse to the surface of the glass article to form the transparent hydrophobic surface. Optionally, a fluorosilane agent can be applied to the transparent hydrophobic surface to further increase its hydrophobicity.

The method can be utilized in a variety of glass-forming operations including, for example, molding, float glass forming, draw down glass forming, tube drawing, pressing and blowing. Inorganic particles such as silica, alumina, zirconia, glass frit, mixed metal oxides, and combinations of the foregoing, can be applied to conventional commercial glass compositions such as soda lime silica, borosilicate, alumino-silicate, barium silicate, lead silicate, phosphate, silica, and other relevant glasses.

The transparent hydrophobic surface formed in accordance with the method of the invention has a nano-structured texture, which makes the surface of the glass article very hydrophobic and easy to clean. In addition, application of the transparent hydrophobic surface to the glass article does not adversely affect the optical clarity of the glass article and it helps reduce the amount of incident light reflected from the surface of the glass article. Thus, glass articles having a transparent hydrophobic surface formed in accordance with the method of the invention are particularly suitable for use in solar cells, architectural glass, and other applications where hydrophobicity and high increased light transmission is desired.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides a method of forming a glass article having a transparent hydrophobic surface during a glass-forming operation. For ease of illustration, the method will first be described as practiced in a float glass-forming operation. However, it will be appreciated that the method can be practiced in a variety of other glass-forming operations including, molding, draw down glass forming, tube drawing, pressing and blowing.

Figure 1:
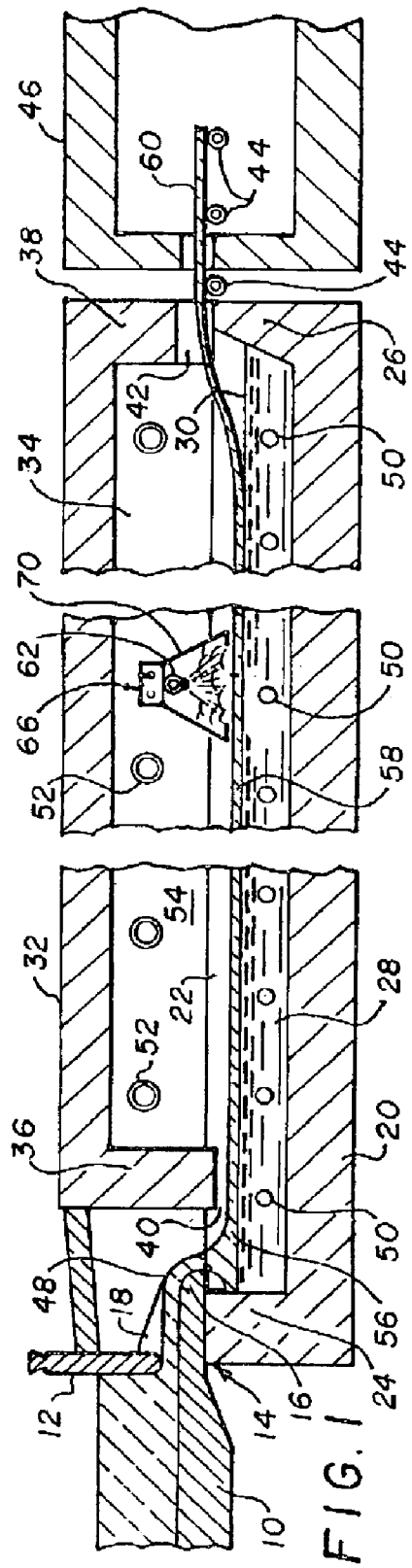
FIG. 1 is schematic side sectional view of a float glass-forming operation including portions of the delivery end of a glass melting furnace at the left end and the annealing lehr at the right end.
Figure 2:
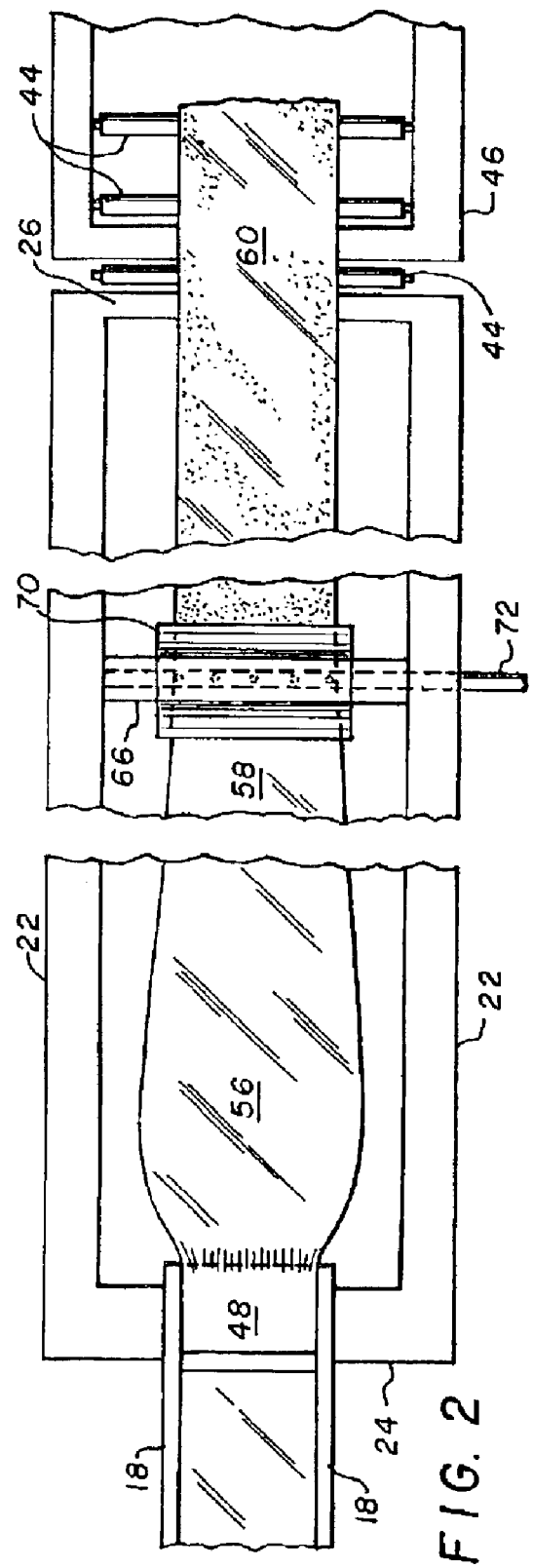
FIG. 2 is a schematic plan view of the float-glass forming operation shown in FIG. 1.

With reference to FIGS. 1 and 2, a forehearth of a continuous glass melting furnace is shown at 10 and a regulating tweel at 12. The forehearth 10 ends in a spout 14 comprising a lip 16 and side jams 18, one of which is shown in FIG. 1. The lip 16 and side jams 18 together constitute a spout of generally rectangular cross section.

The spout 14 is disposed above the floor 20 of an elongated tank structure including sidewalls 22 joined together to form an integral structure with the floor 20, and an end wall 24 at the inlet end of the tank and an end wall 26 at the outlet end of the tank. The tank structure holds a bath of molten metal 28 whose surface level is indicated at 30. The bath is, for example, a bath of molten tin or a molten tin alloy in which the tin predominates and which has a specific gravity greater than that of the glass.

A roof structure supported over the tank structure includes a roof 32, sidewalls 34 and integral end walls 36 and 38 respectively at the inlet and outlet ends of the bath. The inlet end wall 36 extends downwardly close to the surface 30 of the molten metal to define with that surface an inlet 40 which is restricted in height and through which molten glass is advanced along the bath.

The outlet end wall 38 of the roof structure defines with the outlet end wall 26 of the tank structure an outlet 42 through which the ultimate ribbon of glass produced from the bath is discharged onto driven conveyor rollers 44 mounted outside the outlet end of the tank structure and disposed somewhat above the level of the top of end wall 26 of the tank structure so that the ribbon is lifted clear of the wall 26 for discharge through the outlet 42. The rollers 44 convey the ultimate ribbon of glass to an annealing lehr 46 in a well-known manner and also apply tractive effort to the ribbon of glass to assist in advancing the ribbon as it glides along the surface of the bath 28.

Molten glass 48, for example, molten soda lime silica glass, is poured onto the bath 10 of the molten metal from the spout 14 and the tweel 12 regulates the rate of flow of the molten glass 48 over the spout lip 16 to form a layer of molten glass in the bath. The temperature of the glass as it is advanced along the bath is regulated from the inlet end, where the temperature is usually about 1200° C. down to a discharge end, where the temperature is usually about 525° C., by temperature regulators 50 immersed in the bath 10 and temperature regulators 52 mounted in the head space 54 defined by the roof structure over the bath. Depending upon the composition of the glass and processing conditions, the temperature of the glass can vary at the inlet end from between about 850° C. to about 1200° C. and at the outlet end from between about 450° C. to about 650° C.

A plenum of protective gas is maintained in the substantially closed head space 54. The protective gas is supplied through appropriate ducts (not shown) in the roof structure and preferably contains a reducing constituent. For example, the protective atmosphere may consist of 10% hydrogen and 90% nitrogen. There is a small outward flow of protective gas through the inlet 40 and outlet 42 from the head space 54.

The temperature of the glass is regulated by temperature regulators 50 and 52 as the glass advances along the bath to insure that a layer of molten glass 56 is established on the bath. This layer 56 is advanced through the inlet 40 and during this advance there is unhindered lateral flow of the molten glass to develop on the bath surface from the layer 56 a buoyant body 58 of molten glass, which is then advanced in the form of a ribbon along the bath. The width of the tank structure at the surface level of the bath is greater than the width of the buoyant body or ribbon 48 of molten glass so that there is no limitation to the initial free lateral flow of the molten glass.

By properly controlling the rate of introduction of molten glass onto the molten metal bath, a glass ribbon 58 having a desired even thickness can be achieved. During its advance along the molten metal bath, the ribbon 58 is cooled into a structurally integral sheet 60 which may then be lifted from the bath at the discharge end 42 by the driven conveyor rollers 44 which pull the sheet 60 into the lehr 46 where the glass is annealed in a conventional manner. As can be appreciated, the fluidity of the ribbon 58 varies along its length as it is advanced across the molten metal bath.

A spray header 62 is mounted transversely of the tank structure just above the path of travel of the upper surface of the ribbon of glass 58, which is developed from the buoyant body. The spray header 62 is preferably provided with a series of spray nozzles 64 along its length which communicate with the interior of the header 62 for directing a sprayed material, to be described hereinbelow, onto the surface of the advancing ribbon of glass 58. The spray header 62 is supported by a water-cooled support beam 66 which in turn is supported from the side walls 34 of the roof structure. Water circulates through the conduits within the support beam 66 to cool the support beam 66 and spray header 62 in order to maintain the structural integrity thereof and to maintain the sprayed material at a relatively low temperature compared to the temperature of the glass ribbon 58. A hood 70 is supported from the support beam 66 around the spray header 62 to contain and give direction to the spray issuing from the spray header 62. The lower end of the hood 70 is maintained just above the path of travel of the upper surface of the ribbon of glass 58.

In the preferred embodiment, a plurality of spray nozzles are positioned along the underside of the spray header 62 and are maintained a distance above the surface of the ribbon of glass. Preferably, the spray nozzles of the spray header 62 are spaced a small distance from each other and extend substantially across the width of the ribbon of glass 58 so that the spray issuing therefrom is substantially uniform across the advancing ribbon 58. The sprayed material is conducted to the interior of the spray header 62 by means of a supply line 72 that extends through one of the side walls 34 of the roof structure.

The sprayed material that is discharged onto the upper surface of the advancing ribbon of glass 58 through the spray nozzles comprises a plurality of solid particles of inorganic material. The particles of inorganic material are preferably entrained in a carrier stream, which is typically an inert gas such as nitrogen.

The particles of inorganic material are supplied under pressure to the spray header 62 in order that the particles of inorganic material may be sprayed onto the surface of the advancing ribbon of glass 58. The pressure of the spray is not critical, but need only be as great as necessary to insure that it will pass through the spray nozzles and be directed downwardly onto the surface of the glass 58. It is important that the particles of inorganic material be in solid phase when they exit the spray nozzles, which can be accomplished by maintaining the temperature within the spray header 62 at a reduced temperature from that of the ribbon of glass 58 by means of the cooling conduits 68 of the support beam 66.

In the preferred embodiment of the invention, the particles of inorganic material have an average particle diameter of less than about 400 nm. The particles of inorganic material can comprise silica, alumina, zirconia, glass frit, mixed metal oxides, and combinations of the foregoing. Presently preferred compositions include fumed nano-sized particulates of silica, alumina, zirconia and the like. Fumed products are commercially available from Degussa Corporation under the AEROSIL® trademark. Frits, pigments, clays, silica, and other structure forming solid particulate inorganic materials may also be used. These particulates may be combined with silanes, organo-metallic silicates, organo-metallic titanates, and fluoroalkylsilicates and similar compounds.

The spray header 62 is located in the tank structure where the temperature of the glass ribbon 58 is within the range of from about 700° C. to about 1200° C. Generally speaking, when the glass is within this temperature range, the particles of inorganic material carried by the carrier gas tend to fuse and/or sinter onto the surface of the glass, becoming permanently bonded thereto and forming a nano-sized texture or structure on the surface of the glass. This nano-structure or texture survives subsequent treatment in the annealing lehr.

It will be appreciated that the location of the spray header will be determined based upon the temperature profile of the glass ribbon and by the composition of the inorganic material being deposited thereon. Optimally, the spray header is situated such that the inorganic material sufficiently fuses and/or sinters to the glass to provide a nano-sized texture or structure on the surface of the glass.

Particles of inorganic material having an average size larger than 400 nm can be used to create micro-sized textures, as opposed to nano-sized textures. However, use of particles of less than about 400 nm is preferred because such particles have diameters that are less than the wavelength of visible light, thus appearing transparent when fused and/or sintered to the surface of the glass. The stippling shown in FIG. 2 is greatly exaggerated to show the particles adhered to the surface of the glass. In practice, the particles are so small that they cannot be seen with the naked eye.

The surface thus formed on the ribbon of glass is very hydrophobic and easy to clean. In addition, it improves the transmission of light through the glass because it reduces the amount of light reflected from the surface thereof.

Optionally, one or more fluorosilane agents may be applied to the transparent hydrophobic surface to further improve the hydrophobicity of the glass. The fluorosilane agents may be applied in-line with the glass-forming operation. However, if the glass is to be subjected to post-forming cutting, decorating, shaping, and/or tempering, it is usually more practical to apply the fluorosilane agents using the heat energy associated with such post-forming operations.

Although the invention has been described in terms of a float glass-forming operation, the invention can be successfully practiced in a variety of glass-forming operations including, for example, molding, float glass forming, draw down glass forming, tube drawing, pressing, blowing and the like. Particles of inorganic material must be forced into contact with the surface of the glass during the forming operation when the glass is at a temperature within the range of from about 700° C. to about 1200° C. The invention can be used to provide a transparent hydrophobic surface on a variety of commercial glass compositions including, for example, soda lime silica, borosilicate, alumino-silicate, barium silicate, lead silicate, phosphate, silica, and other relevant glasses.

As noted above, known processes for producing hydrophobic surfaces on glass involve secondary processes such as screen-printing, roll coating, spraying, electrostatic, etc. that apply texture creating coatings to glass articles after they have been formed. The coated glass must then be reheated to bond the texture-producing materials to the glass. The present invention advantageously produces a hydrophobic texture on the surface of the glass during the glass-forming operation and avoids the need for reheating the glass, which provides energy savings, production cost savings (extra handling, capital equipment, labor, etc.) and materials savings (cleaning compounds, organic mediums, etc.).

Furthermore, the inorganic particles are applied to the glass as it is being formed, meaning that the glass is in a pristine uncontaminated condition. No solvents are needed to clean the glass prior to application of the texturing material. In addition, no solvents are needed to introduce the texture forming inorganic materials to the glass. The higher working temperatures also allow for the use of more durable inorganic materials.

Glass articles having transparent hydrophobic surfaces formed in accordance with the method of the invention can be used in a variety of applications where a transparent, durable, hydrophobic easy to clean glass surface is desired. Exemplary applications include outdoor lighting, automotive glass, glass for use in the fabrication of solar panels, and other sensor cover glass applications.

The desired nano-textured glass surfaces can be created during glass-forming operations by means other than previously described herein. For example, laser beams can be used to impart sufficient localized energy to the surface of the glass ribbon as it cools to create perturbations that form the micro-structure. Another method of forming the micro-structure involves application of high intensity sound waves, which also create perturbations that form the micro-structure. The energy and precision that must be maintained in order to successfully practice these alternative methods makes them less attractive than the method disclosed in this application.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of forming a glass article having a transparent hydrophobic surface during a glass-forming operation, comprising: providing a plurality of particles of inorganic material having an average diameter of less than about 400 nm; applying the particles of inorganic material to a surface of the glass article when the glass article is at a temperature within the range of from about 700° C. to about 1200° C.; and fusing the inorganic particles to the surface of the glass article to form the transparent hydrophobic surface.

2. The method according to claim 1 wherein the plurality of particles of inorganic material are entrained in a carrier stream.

3. The method according to claim 2 wherein the carrier stream is an inert gas.

4. The method according to claim 1 wherein the inorganic material is selected from the group consisting of silica, alumina, zirconia, glass frit, mixed metal oxides, and combinations of the foregoing.

5. The method according to claim 1 further comprising applying a fluorosilane agent to the transparent hydrophobic surface and curing the fluorosilane agent at a temperature of between about 200° C. and about 300° C.

6. The method according to claim 5 wherein the fluorosilane agent is applied during the glass-forming operation and the glass article is not reheated.

7. The method according to claim 1 wherein the glass-forming operation is selected from the group consisting of molding, float glass forming, draw down glass forming, tube drawing, pressing and blowing.

8. A method of forming a glass article having a transparent hydrophobic surface during a float glass-forming operation, comprising: entraining a plurality of solid particles of inorganic material having an average diameter of less than about 400 nm in a carrier gas; flowing the carrier gas onto a surface of a ribbon of glass that is being drawn across a bath of molten tin when the glass is at a temperature within the range of from about 700° C. to about 1200° C.; and fusing the solid particles of inorganic material to the surface of the ribbon of glass to form the transparent hydrophobic surface on the glass article.

9. The method according to claim 8 wherein the inorganic material is selected from the group consisting of silica, alumina, zirconia, glass frit, mixed metal oxides, and combinations of the foregoing.

10. The method according to claim 8 further comprising applying a fluorosilane agent to the transparent hydrophobic surface and curing the fluorosilane agent at a temperature of between about 200° C. and about 300° C.

* * * * *